(12) United States Patent
Nord

(10) Patent No.: US 8,419,078 B2
(45) Date of Patent: Apr. 16, 2013

(54) METHOD AND APPARATUS FOR TYING RADIANT HEAT TUBING TO WIRE MESH

(76) Inventor: Andrew Nord, Oswego, IL (US)

( * ) Notice: Subject to any disclaimer, the term of this patent is extended or adjusted under 35 U.S.C. 154(b) by 0 days.

(21) Appl. No.: 13/134,827

(22) Filed: Jun. 17, 2011

(65) Prior Publication Data

US 2012/0319402 A1    Dec. 20, 2012

(51) Int. Cl.
*B65H 69/04* (2006.01)
(52) U.S. Cl.
USPC ............................................. 289/1.5; 289/17
(58) Field of Classification Search ............... 289/1.5, 289/17; 140/93 R, 93.6, 118, 119, 122
See application file for complete search history.

(56) References Cited

U.S. PATENT DOCUMENTS

| | | | | |
|---|---|---|---|---|
| 3,827,108 A * | 8/1974 | Jewett | ............................ | 24/66.2 |
| 4,413,660 A * | 11/1983 | Conrad | ........................ | 140/119 |
| 5,004,020 A * | 4/1991 | Meinershagen | ............. | 140/93.6 |
| 5,927,059 A * | 7/1999 | Goertz | ................................ | 57/3 |
| 6,033,423 A * | 3/2000 | Ken et al. | ...................... | 606/200 |
| 6,128,882 A * | 10/2000 | Jones | .............................. | 52/665 |
| 6,606,765 B2 * | 8/2003 | Edmondson | ............. | 24/265 CD |

* cited by examiner

*Primary Examiner* — Shaun R Hurley
(74) *Attorney, Agent, or Firm* — Allan J. Franowsky

(57) ABSTRACT

An installer, securing radiant heat tubing to wire mesh while standing, uses an apparatus with an adjustable telescoping housing. The installer, by actuating a power drill, or other electrically driven device, rotates a shaft that is attached to a drive roller in close proximity to an idler roller. These rollers frictionally engage an end of a preformed plastic binding coil. The preformed plastic binding coil end is advanced through a feeding tube that allows the end of the preformed plastic binding coil to wrap around the intersection where the radiant heat tubing and wire mesh meet. As the preformed plastic binding coil resumes its coiled configuration, the tying operation is complete. A cutter blade actuated by the user frees the apparatus from the tied radiant heat tubing and wire mesh.

9 Claims, 2 Drawing Sheets

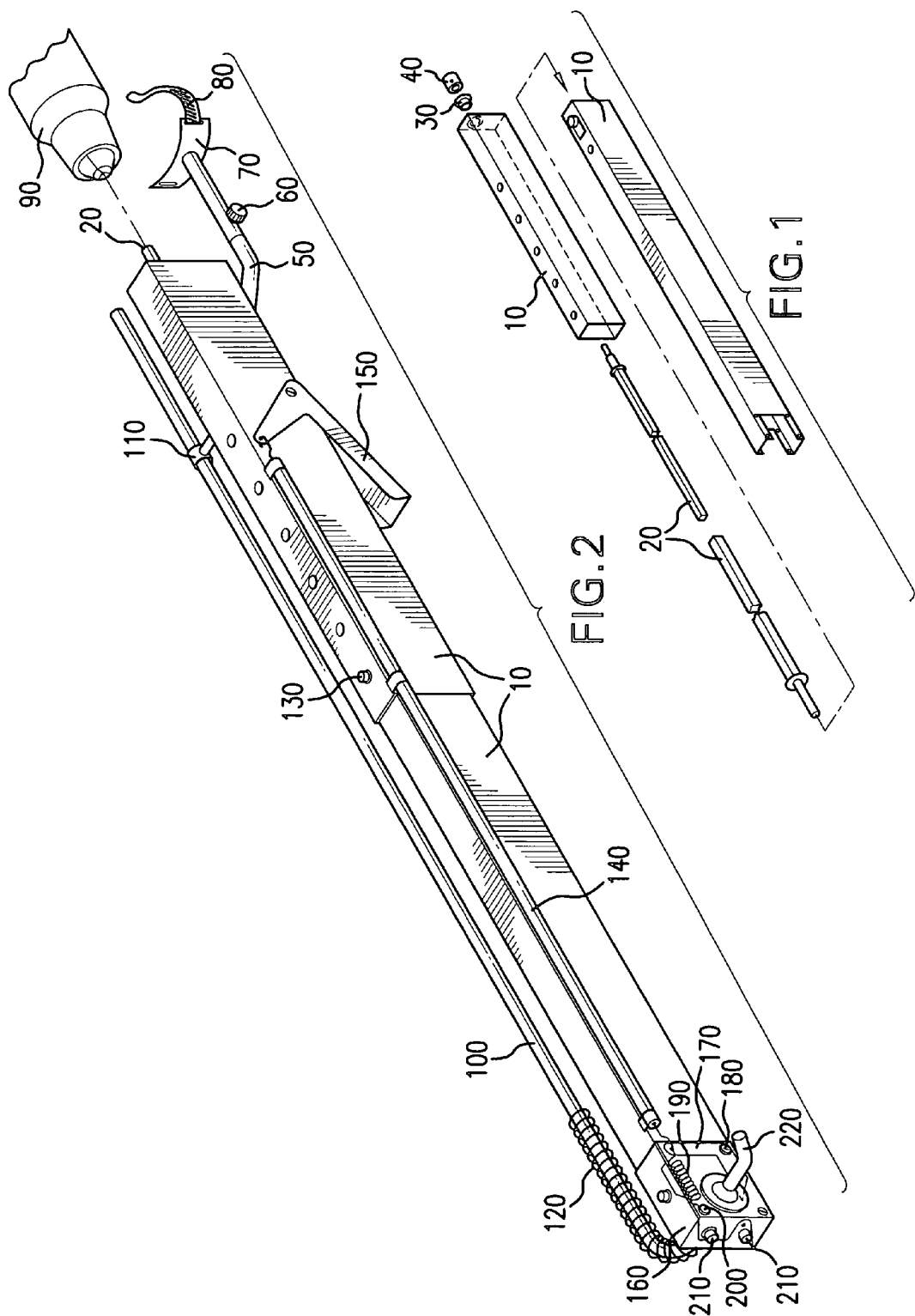

METHOD AND APPARATUS FOR TYING RADIANT HEAT TUBING TO WIRE MESH

FIELD OF THE INVENTION

This invention generally pertains to the effective tying of radiant heating tubing to a wire mesh that is usually found in heated cement slabs, such as that found in heated driveways and floors that have radiant heat. Specifically, this invention is a tool that enables the operator to secure a commonly used plastic hose employed in hydronic heating systems to a wire mesh. This tool is powered by a conventional battery powered drill at one end of its adjustable length housing that rotates a shaft that is supported by bearings to the head of the tool where the tying takes place. The operator of the tool remains in a standing position as a preformed plastic coil is fed out of the head of the tool where the tying occurs, wrapping itself around both the radiant tubing and a wire, part of the wire mesh. After the appropriate number of turns of preformed plastic coil has wrapped around the radiant tubing and wire, thereby securing the radiant tubing and wire in place for the eventual pouring of cement, the operator stops the drill and activates the cutter at the head of the tool, thereby releasing the preformed plastic coil in its wrapped position.

DESCRIPTION OF THE PRIOR ART

In hydronic heating systems, such as those commonly used in heated driveways and heated flooring in homes, radiant tubing is used to propel heated water from a pump through the system and back again to be reheated. Typically, radiant tubing is a polyethylene material, known as PEX plastic hose. The radiant tubing is securely mounted to a wire mesh raised above the final grade under the cement slab to about two inches below the cement surface. In operation, the heat is exchanged from the radiant tubing to the surrounding cement to provide heat to melt ice and snow from driveways as well as to provide heat for homes.

Typically, about one foot of radiant hose is used for each square foot of heated slab. The radiant hose is set on the wire mesh using a layout plan designed to provide the most effective heating pattern for the job at hand. The radiant hose is normally secured to the mesh by two common methods. One method is to use wire ties. The installer of the radiant hose has to bend down or squat to place the wire tie in place and twist the tie with a tool for that purpose. The wire ties are placed around the radiant tubing and a wire part of the wire mesh every two feet, approximately. A multi-thousand square foot project could require bending or squatting thousands of times to install the ties. This could easily lead to back and knee problems. It is also difficult to tell when the wire ties are twisted too tightly. If too tight, the ties will reduce the diameter of the radiant tubing, and a number of overly tightened ties will effectively reduce the overall effectiveness of the entire system. In addition, the ties are prone to rust which could create sharp spots or edges that could eventually erode the plastic radiant tubing. The ends of the wire ties are sharp and if inadvertently the ends puncture the radiant tubing and not discovered before the cement is poured, it can be difficult to pinpoint the leak. In addition, wire ties can be difficult to install when the weather is cold and the installers fingers have reduced dexterity.

Another common method to secure the radiant tubing to the wire mesh is to use nylon cable ties. This method also has a host of problems. The installer still has to bend down or squat, creating possible back or knee problems. A problem with the proper adjustment of the tension of the cable tie exists when pulling the end of the tie through the ratcheted head. It is possible to pull the cable tie too tightly, thereby reducing the diameter of the radiant tubing. A number of overly tightened cable ties will effectively reduce the overall effectiveness of the entire system. The cable ties require more time to install than wire ties because the cable tie has to be threaded through the ratchet opening that secures the tie. Once the cable tie is secured, its long end has to be cut off, otherwise that end may protrude through the surface of the cement when it is poured. Further, the long ends have to be disposed of to prevent these ends from floating in the wet concrete causing imperfections on the surface of the concrete. In cold weather, the reduced dexterity of the installer's fingers and the wearing of gloves further reduce installation time.

A U.S. Pat. No. 2,491,582, issued to Reid is a tool, ratchet wrench operated, to tighten and tie cement forms for rigidity when pouring cement. This invention is not applicable to securing radiant tubing to a wire mesh. In addition, the tightening force of this tool would surely crush radiant tubing.

A U.S. Pat. No. 3,880,294, issued to Sarff is a hand held electric motor powered tool for feeding and twisting wire ties to rebar. The force this tool uses would crush radiant tubing.

A U.S. Pat. No. 4,362,192, issued to Furlong is a hand held electric motor powered tool for binding concrete-reinforcing bars with wire ties. This invention is also not suited to securing radiant tubing to a wire mesh because of the high forces this tool employs when twisting wire ties to secure concrete-reinforcing bars.

A U.S. Pat. No. 4,413,660, issued to Conrad is an electric drill powered tool to rapidly twist-tie wire ceiling hangars. Here too, the twisting force would be too great for the radiant tubing.

A U.S. Pat. No. 5,217,049, issued to Forsyth is a hand held electric motor powered tool for twisting wire ties to rebar. This tool would exert too much force to radiant tubing, causing it to be crushed.

A U.S. Pat. No. 5,431,196, issued to Forrester is a hand held electric motor powered tool for twisting wire ties around rebar. This tool would provide too much force to radiant tubing, crushing it.

A U.S. Pat. No. 5,613,530, issued to Kincel is a hand held electric motor powered twist tie or wire twister. Although this invention does not exert the tightening force intended for rebar tying, it is possible to exert too much force on wire ties, running the risk of crushing the radiant tubing.

A U.S. Pat. No. 5,778,946, issued to Pellenc is a hand held electric motor powered tool for binding and tying shrubbery, tree branches, and vines. Although not as forceful as ties for rebar, this tool has the capacity to over tighten radiant tubing.

A U.S. Pat. No. 5,842,506, issued to Peters is a hand held electric motor powered tool for forming and installing wire ties to join rebar segments. This tool is too forceful for radiant tubing in that the radiant tubing would be crushed with its application.

A U.S. Pat. No. 7,290,570 B1, issued to Spikes is an electric drill powered wire twisting device to secure fence wire or barbed wire to a fence structure. This tool would apply too much pressure to radiant tubing.

Accordingly, a need exists for a tool that would considerably speed up the entire process of attaching radiant tubing to a wire mesh. Rather than the current method of bending and squatting every two feet or so to twist a wire tie or insert a nylon end into a ratchet securing head, a tool is needed that can be put in position at the place to be tied, and instantly feed and tie the binding material around the radiant tubing and wire mesh. This tool should allow an installer to work in a standing position to eliminate the stresses that accompany bending and squatting. The elimination of bending and squatting will greatly speed the time required to attach the radiant tubing to the wire mesh. This tool should eliminate any concerns that the binding material could possibly be placed too tightly around the radiant tubing and therefore compress its diameter. This tool should quickly separate from the binding material to move on to the next position to be bound.

SUMMARY OF THE INVENTION

An object of this invention is to allow an installer of binding material to remain in a standing position when binding or tying radiant tubing to a wire mesh. Another object of this invention is to greatly speed up the entire process of binding radiant tubing to wire mesh. A further object of this invention is to prevent the inadvertent over-tightening of the binding material that could possibly reduce the diameter of the radiant tubing, constricting the flow of the heating medium. A further object of this invention is to provide the ability for the installation tool to use binding material that will not rust or corrode or possess sharp edges that could contribute to puncturing the radiant tubing. Still further, an object of this invention is to operate easily in cold weather, thereby eliminating dexterity problems in cold hands and fingers and the clumsiness associated with wearing gloves.

This invention consists of a long, telescoping housing, that can be adjusted in length to meet the height needs of the person installing binding material to secure radiant tubing to a wire mesh. This allows the installer to assume the most comfortable standing position during the installation. At the top of the adjustable housing is an attachment means for mounting a portable battery powered drill. The rotational axis of the drill is aligned with the longitudinal axis of the adjustable housing, allowing the drill chuck to attach to an adjustable length drive shaft and to rotate the drive shaft when the drill trigger is depressed. At the end of the adjustable housing, opposite the end where the drill is mounted, is a drive mechanism housing. The drive shaft is coupled to a cylindrical rubber surfaced drive roller supported by bearings fixed in the drive mechanism housing to allow the drive roller to rotate as the drive shaft rotates. In close proximity with the drive roller is an idler cylindrical rubber surfaced roller supported by bearings fixed in the drive mechanism housing. This idler cylindrical rubber surfaced roller has a rotational axis parallel to the rotational axis of the drive wheel in the same two dimensional plane. The space between the idler roller and the drive roller is such that the thickness of preformed plastic coil binding (the kind conventionally used in binding notebooks and widely available) would be tightly held between the rubber surfaces of both the idler roller and the drive roller. Rotation of the drive roller would advance the preformed plastic coil binding in a direction away from the plane of the axes of the idler and drive rollers.

The preformed plastic coil binding is inserted on a long rod, mounted alongside the adjustable housing, and fed into the drive mechanism housing. A provision exists to increase the space between the rollers so the installer can insert the end of the preformed plastic coil binding between the rollers and return the rollers to tightly engage the plastic coil end. Advancing the rollers feeds the plastic coil end into a funnel shaped enclosure which terminates as a slightly curved feed tube that guides the tip of the plastic coil end right at the spot where further advancement of the plastic coil will curve itself into a coiled configuration around the radiant tubing and wire mesh where they intersect each other. The result, after several turns of the plastic coil are allowed to rap around the radiant tubing and wire mesh, is that the radiant tubing and wire mesh are now joined together. At the wide end of the funnel enclosure, a slot exists for the passage of a cutting blade, when actuated, cuts the plastic coil loose, leaving a new plastic tip in the funnel enclosure, guiding that tip through the slightly curved feed tube, ready to bind the next length of radiant tubing to the wire mesh. This process of binding eliminates all the bending, squatting, mechanical tying and cutting, making for a swift procedure without the fear of over-tightening the bind.

BRIEF DESCRIPTION OF THE DRAWINGS

FIG. 1 is a view showing the separation of the adjustable telescoping housing and the telescoping drive shaft.

FIG. 2 is a view of the assembled apparatus for tying radiant heat tubing to wire mesh.

DETAILED DESCRIPTION OF THE INVENTION

Figure 5:
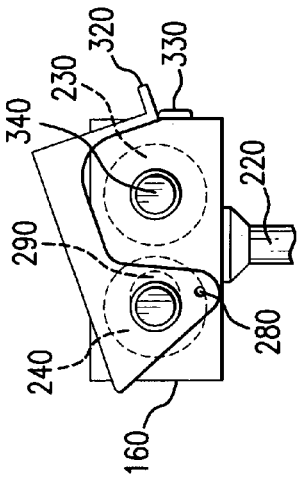
FIG. 5 is an edge view of the drive mechanism housing showing the release lever raised to disengage the drive and idler rollers to allow the installer to insert the end of the preformed plastic coil binding between the drive and idler rollers.

The current invention is a tool or apparatus for tying radiant heat tubing to wire mesh. FIG. 1 shows the main body of the invention, an adjustable telescoping housing 10 that contains an adjustable telescoping drive shaft 20 supported at one end by a bearing 30 and a shaft lock bushing 40. FIG. 2 shows the adjustable telescoping housing assembly 10 in its operational position and secured by spring loaded adjustment button 130. At one end of the housing assembly 10 is an adjustable bracket 50 with an adjustment knob 60 allowing for positioning of the drive motor rest shoe 70, at which end is an attached hook and loop fastener strap 80 to secure the battery powered drill 90 to the drive motor rest shoe 70. The chuck of drill 90 engages the telescoping drive shaft 20. At the other end of the housing assembly 10 is mounted a drive mechanism housing 160, with an attached plastic coil feed guide 100. The preformed plastic coil binding 120 is slipped over the plastic coil feed guide 100, which is then secured at its other end by a plastic coil feed guide clamp 110. At the opposing side of the housing assembly 10 is a cutter blade cable 140 that actuates cutter blade 170 when the cutter blade lever 150 is pressed. Cutter blade 170 rotates on cutter blade pivot 180. When cutter blade lever 150 is released, a cutter blade return spring 190, secured by a spring attach screw 200, returns the cutter blade 170 to its resting position. The drive and idler roller shafts 210 protrude out the end of the drive mechanism housing 160. Also protruding out of the drive mechanism housing 160 is plastic coil feed tube 220, through which the preformed plastic coil binding 120 exits. As the preformed plastic coil binding 120 exits, it resumes its coiled configuration as it encircles the plastic radiant tubing and the wire mesh.

Figure 3:
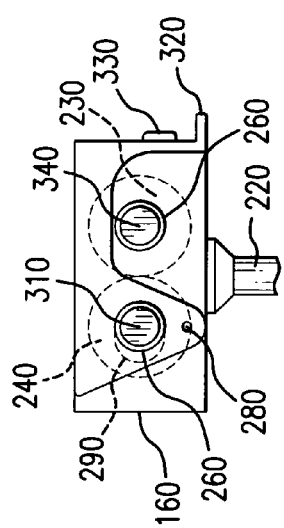
FIG. 3 is an edge view of the drive mechanism housing showing the drive roller and idler roller in the engaged position to project the preformed plastic coil binding between said rollers.

FIG. 3 shows an edge view of the drive mechanism housing 160 with the ends of the driver roller shaft 340 and idler roller shaft 310 exposed. The shafts are supported by bearings 260.

Figure 6:
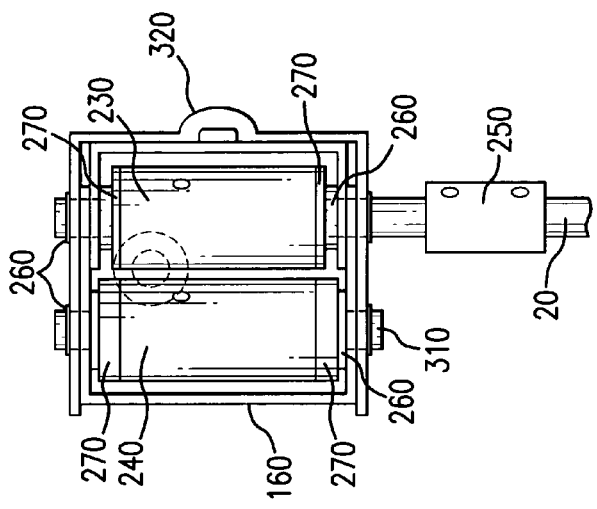
FIG. 6 is a side view of the drive mechanism housing with the cover removed to show the drive and idler rollers in the disengaged position.
Figure 4:
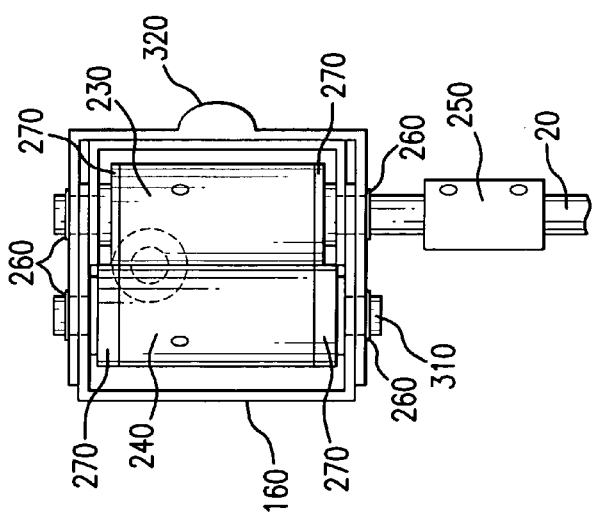
FIG. 4 is a side view of the drive mechanism housing with the cover removed to show the drive and idler rollers in the engaged position.

Drive roller 230 is in close engagement with idler roller 240. The pivot slot 290 is shown by a dotted outline which allows idler roller shaft 240 to slide back and forth in the pivot slot 290. Bearing 260 has opposing flat surfaces to prevent bearing 260 from rotating in the pivot slot 290. Release lever 320 is in its closed position secured by spring loaded button 330. The release lever 320 is attached to the drive mechanism housing 160 by hinge pin 280. Plastic coil feed tube 220 is shown in position on the drive mechanism housing 160. FIG. 4 shows a side view of the drive mechanism housing 160 with drive roller 230 in a close or engaged position with idler roller 240. Spacer bushings 270 hold drive roller 230 and idler roller 240 in position. Telescoping drive shaft 20 is shown attached to the drive roller 230 shaft by shaft coupler 250. FIG. 5 is an edge view of the drive mechanism housing 160 showing the release lever 320 raised to disengage or move away from the drive roller 230 and the idler roller 240 to allow the installer to insert the end of the preformed plastic coil binding 120 between the drive roller 230 and the idler roller 240. FIG. 6 is a side view of the drive mechanism housing 160 with the cover removed to show the drive roller 230 and the idler roller 240 in the disengaged position.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

I claim:

1. An apparatus for tying radiant heat tubing to a wire mesh, while an installer remains in a standing position when performing this activity, comprising:
   a. a drive shaft housing;
   b. a drive shaft mounted in and parallel to the axis of the drive shaft housing;
   c. a driving means for rotating the drive shaft supported by a bearing attached to the first end of the housing;
   d. a drive mechanism housing means attached to the second end of the housing for dispensing a preformed plastic coil binding as it wraps around the radiant heat tubing and the wire mesh where they intersect; and
   e. a cutoff means for separating the preformed plastic coil binding wrapped around the radiant heat tubing and the wire mesh from the drive mechanism housing.

2. The apparatus for tying radiant heat tubing to a wire mesh, while an installer remains in a standing position when performing this activity as recited in claim 1, wherein the drive shaft housing is a telescoping structure to provide length adjustment secured by a lock mechanism.

3. The apparatus for tying radiant heat tubing to a wire mesh, while an installer remains in a standing position when performing this activity as recited in claim 2, wherein the lock mechanism is a spring loaded adjustment button.

4. The apparatus for tying radiant heat tubing to a wire mesh, while an installer remains in a standing position when performing this activity as recited in claim 1, wherein the drive shaft is a telescoping shaft that allows length adjustment of the drive shaft when the length of the drive shaft housing is adjusted.

5. The apparatus for tying radiant heat tubing to a wire mesh, while an installer remains in a standing position when performing this activity as recited in claim 1, wherein the driving means is a portable drill.

6. The apparatus for tying radiant heat tubing to a wire mesh, while an installer remains in a standing position when performing this activity as recited in claim 1, further comprising a drive roller mounted in the drive mechanism housing attached to the drive shaft.

7. The apparatus for tying radiant heat tubing to a wire mesh, while an installer remains in a standing position when performing this activity as recited in claim 1, further comprising an idler roller to be driven by the drive roller, both rollers frictionally engaging and dispensing the preformed plastic coil binding.

8. The apparatus for tying radiant heat tubing to a wire mesh, while an installer remains in a standing position when performing this activity as recited in claim 1, wherein the cutoff means is a cutting blade actuated by the user.

9. A method of tying radiant heat tubing to wire mesh with a preformed plastic coil binding material, comprising the steps of: actuating a drive mechanism to provide dispensing of a preformed plastic coil binding to an intersection where the radiant heat tubing and the wire mesh meet allowing the wrapping of the preformed plastic coil binding to tie the radiant heat tubing to the wire mesh and cutting the preformed plastic coil binding free from that intersection.

* * * * *